United States Patent [19]

Giesberg

[11] Patent Number: 4,691,267
[45] Date of Patent: Sep. 1, 1987

[54] FILM ILLUMINATOR

[76] Inventor: Daniel J. Giesberg, 2347 Malcolm Ave., Los Angeles, Calif. 90064

[21] Appl. No.: 695,944

[22] Filed: Jan. 28, 1985

[51] Int. Cl.$^4$ .................. F21V 21/00; F21V 23/02
[52] U.S. Cl. .................... 362/218; 362/222; 362/368; 362/373; 40/361
[58] Field of Search ............ 362/218, 222, 294, 373, 362/368, 147, 260, 432, 370, 221; 40/361

[56] References Cited

U.S. PATENT DOCUMENTS

| | | | |
|---|---|---|---|
| 4,217,629 | 8/1980 | Russell | 362/147 |
| 4,342,072 | 7/1982 | Guritz et al. | 362/222 |
| 4,404,619 | 9/1983 | Ferguson | 362/222 |
| 4,507,719 | 3/1985 | Quiogue | 362/218 |

Primary Examiner—Andrew M. Dolinar
Attorney, Agent, or Firm—Bogucki, Scherlacher, Mok & Roth

[57] ABSTRACT

Heat build up is reduced in x-ray film illuminator apparatus by transferring excess heat from the sources thereof to the exterior of the unit and then into the surrrounding environment. A heat dispersing surface contacts the hottest part of the ballast employed within the unit, with a back wall of the unit itself being spaced from an associated wall, on which the apparatus may be detachably mounted on a special hanger so as to permit a vertical air flow path between the back wall and associated mounting wall surface. A viewing area of the unit is formed by a translucent face plate retained in position along at least the top or upper peripheral portion thereof by a resilient element also capable of retaining in place the film transparency or other media that is being viewed.

14 Claims, 8 Drawing Figures

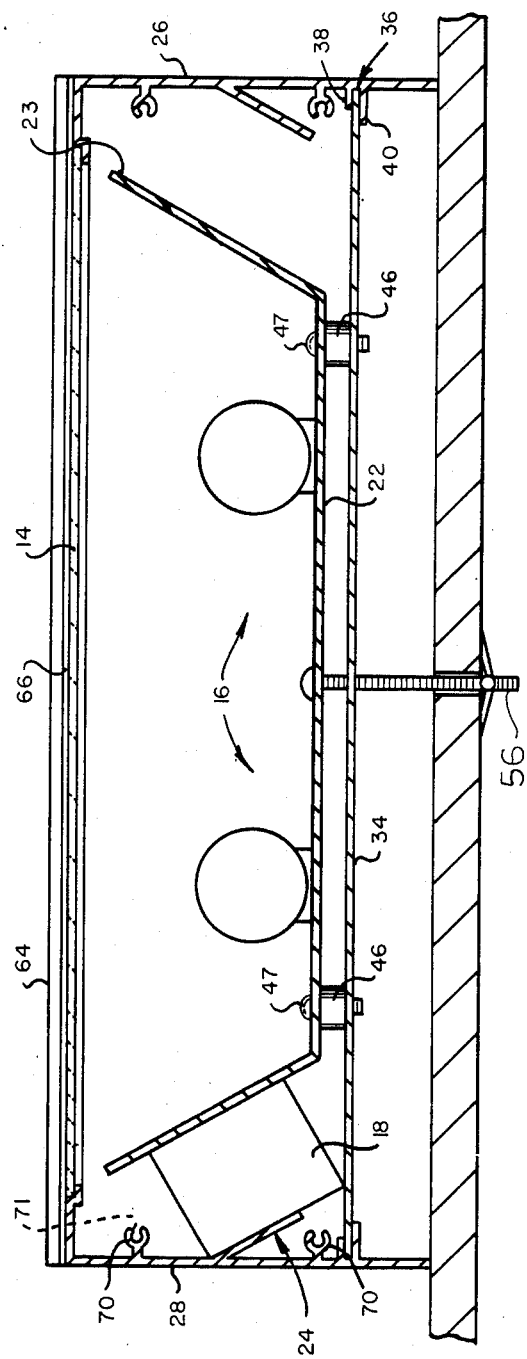
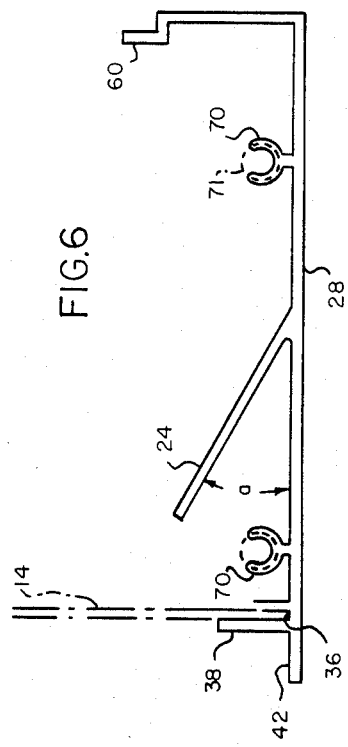

FILM ILLUMINATOR

BACKGROUND OF THE INVENTION

1. Field of the Invention

This invention relates generally to light boxes and illuminators incorporating means for viewing transparent and translucent media and more particularly to such devices for viewing x-ray film, photographic film transparencies, and the like.

2. Description of the Prior Art

Since the use of x-ray photography has become commonplace in hospitals and medical clinics, illuminating screen devices have been developed for display and close analysis of the developed film. Typically, these illuminators use either two or four fifteen-watt, for example, fluorescent light tubes, with one Class P ballast being employed for each two light tubes. It is desirable, however, in film illuminators of this kind, to concentrate a maximum amount of evenly distributed light, measured in candle light, within a minimum amount of space, say fourteen inches by seventeen inches in area or less. The combination of fluorescent tubes and associated ballast concentrated in a small volume generates a large amount of heat, which can, dependent on volume and the amount of use, cause ballast to approach a certain limit temperature. A limit temperature for the type of ballast normally used for this application is preset. When this limit temperature is reached, the ballast will cut off, or "cycle", until the ballast and light tubes cool sufficiently to permit the illuminator to relight. This often can take from five to twenty minutes, during which period the light box system is inoperative. When an illuminator cycles in this fashion in a frequent or consistent manner, a user tends to consider the unit as "broken" and demands repair or replacement from the manufacturer. Thus, there is a need to better cool such film illuminators in order to prevent the overheating problems, without significantly introducing higher costs. Furthermore, designs should be such that the illuminators can be made in different sizes without requiring additional tooling or special parts.

Another difficulty encountered with film illuminators commonly employed is in mounting the unit. Typically, film illuminators are either wall mounted or recessed into a wall. In the latter approach film illuminators are installed so that a majority of the depth of the unit is inside a wall. This technique generally is employed only during new construction or remodeling of existing facilities. The less expensive and more common manner of installing a film illuminator is by hanging the unit on the exterior surface of an office or laboratory wall. This can be done by placing screws in the wall at the desired location and subsequently hanging the unit on the screws by use of "key-hole slots" prepunched into the back of the illuminator enclosure. Nevertheless, this mounting has been a major source of complaint from installers as being time consuming, awkward, and in many cases requiring partial disassembly of the illuminator unit in order to insure proper installation. Frequently, two or more people are required to install such a unit.

The mounting techniques, as discussed above, cause additional problems with heat disbursement as well. Heat from prior film illuminators is transferred both outwardly toward the viewer and also towards a back plate of the unit enclosure. With modern wall construction methods, however, the wall acts as a non-conductive heat barrier. That is, heat is trapped in the illuminator enclosure, and as the heat rises, the ballast overheats and cycling results. In addition, much of the heat is forced to disperse through the viewing or operating area or surface of the illuminator, creating unnecessary user discomfort.

SUMMARY OF THE INVENTION

Illuminator temperature is reduced according to the present invention by efficiently transferring excess thermal energy from a heat source to the exterior of the unit and then into the surrounding environment. In particular, heat is caused to flow to the side, top, bottom, and back of the enclosure of the unit, away from the front viewing surface. In general, the present invention assures that the hottest part of the ballast is in direct contact with a heat dispersing surface. In a specific example in accordance with the invention, a ballast is attached to a removable reflector and is contacted or abutted at its hottest region by an integral wing extending from a specially designed thermally conductive side wall. The walls of the enclosure function as a heat sink, and the enclosure is spaced from the building wall to permit the back surface to be cooled by convective air currents. Where multiple banks of light tubes are used, providing an exceptionally large viewing area, more than one ballast may be used. In this instance a special heat conducting element in the form of a flanged "V" is attached to the back of the illuminator enclosure. A leg of this heat conducting element contacts the top of an intermediately positioned ballast and functions in a similar manner to conduct thermal energy from the ballast to the enclosure body in directions away from the viewing screen.

Heat problems are further minimized according to the present invention by a cooling channel at the rear of the illuminator housing. Natural convection creates an updraft air flow and pulls cooling air from the bottom of the illuminator up and across the back wall and out over the top of the unit. In this manner, cooling of the back wall draws thermal energy from the enclosure and ultimately from the ballasts. In addition, louver-style openings may be provided in the back wall of the illuminator unit to further enhance heat dissipation. The various peripheral walls of the enclosure are advantageously fabricated as metal (e.g. aluminum) extrusions. These extrusions not only provide high heat conductivity and a substantial heat capacity but also can be extruded to any length. Consequently different modular sizes of illuminators can be made from a basic supply of extrusions, requiring only that the viewing screen and back wall be made to specific sizes.

Mounting problems are overcome according to the present invention by mounting an illuminator unit directly on a pre-installed hanger bar instead of directly to an associated wall. The hanger bar is lightweight and can be of any appropriate length. The hanger bar can easily be attached to a wall by one person and has mounting slots arranged to ease any leveling problem. Outwardly extending ears are integrated into the bar at standardized distances that correspond to matching slots provided in the back wall of an illuminator to be mounted. Once the hanger bar is attached to an associated wall, the installer merely lifts the illuminator and inserts the ears into place. He may then additionally secure the unit with a screw through the back wall that is accessed from the front of the illuminator.

BRIEF DESCRIPTION OF THE DRAWINGS

A better understanding of the invention may be had by reference to the following description, taken in conjunction with the accompanying drawings, in which:

FIG. 2 is an enlarged, diagrammatic, sectional view taken generally along the line 2—2 of FIG. 1;

FIG. 6 is a diagrammatic, top plan, detail view of a side wall of an x-ray film illuminator according to the present invention;

DETAILED DESCRIPTION OF THE INVENTION

Figure 1:
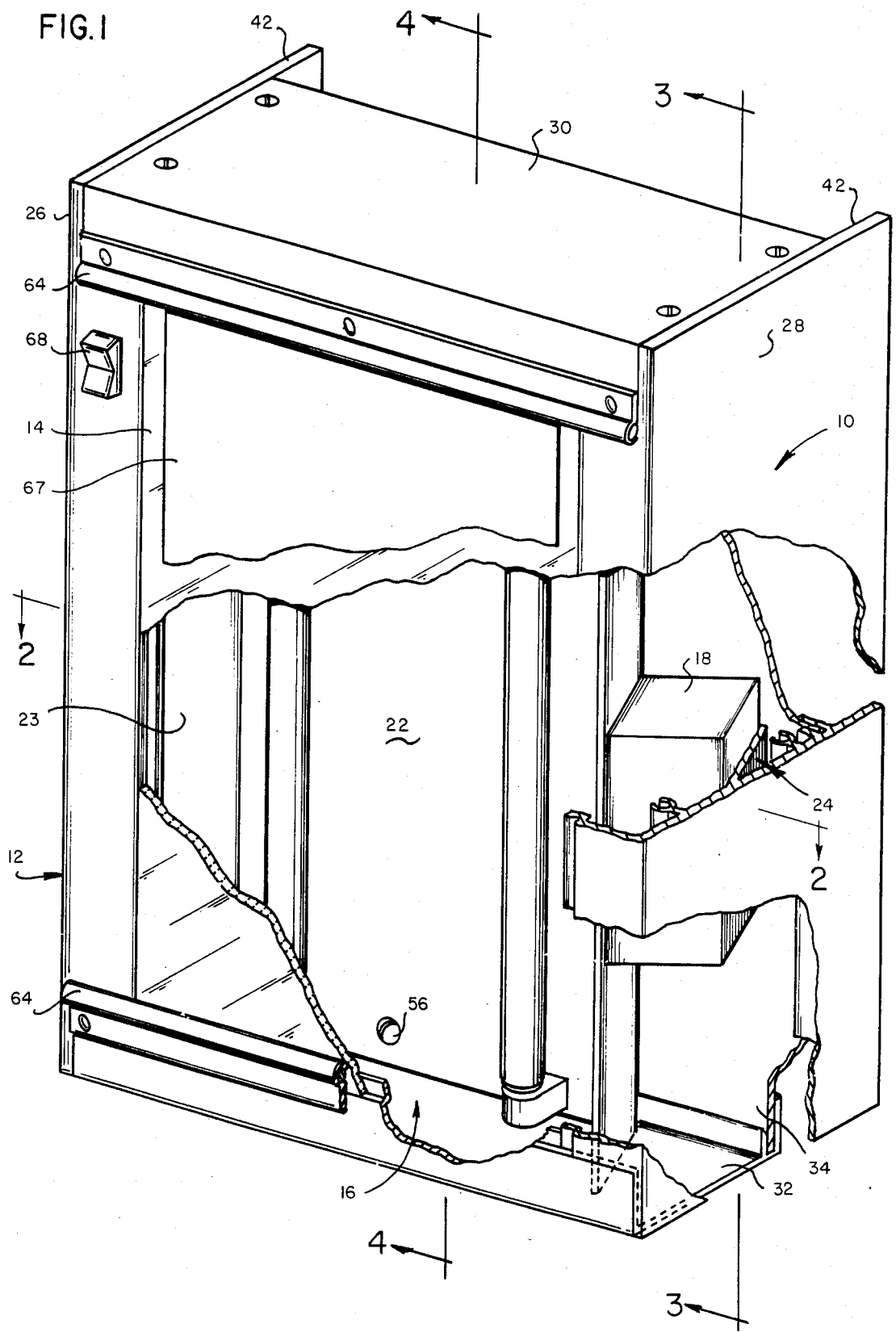
FIG. 1 is a diagrammatic, perspective view, partially cut-away and in section, showing an x-ray film illuminator apparatus.
Figure 3:
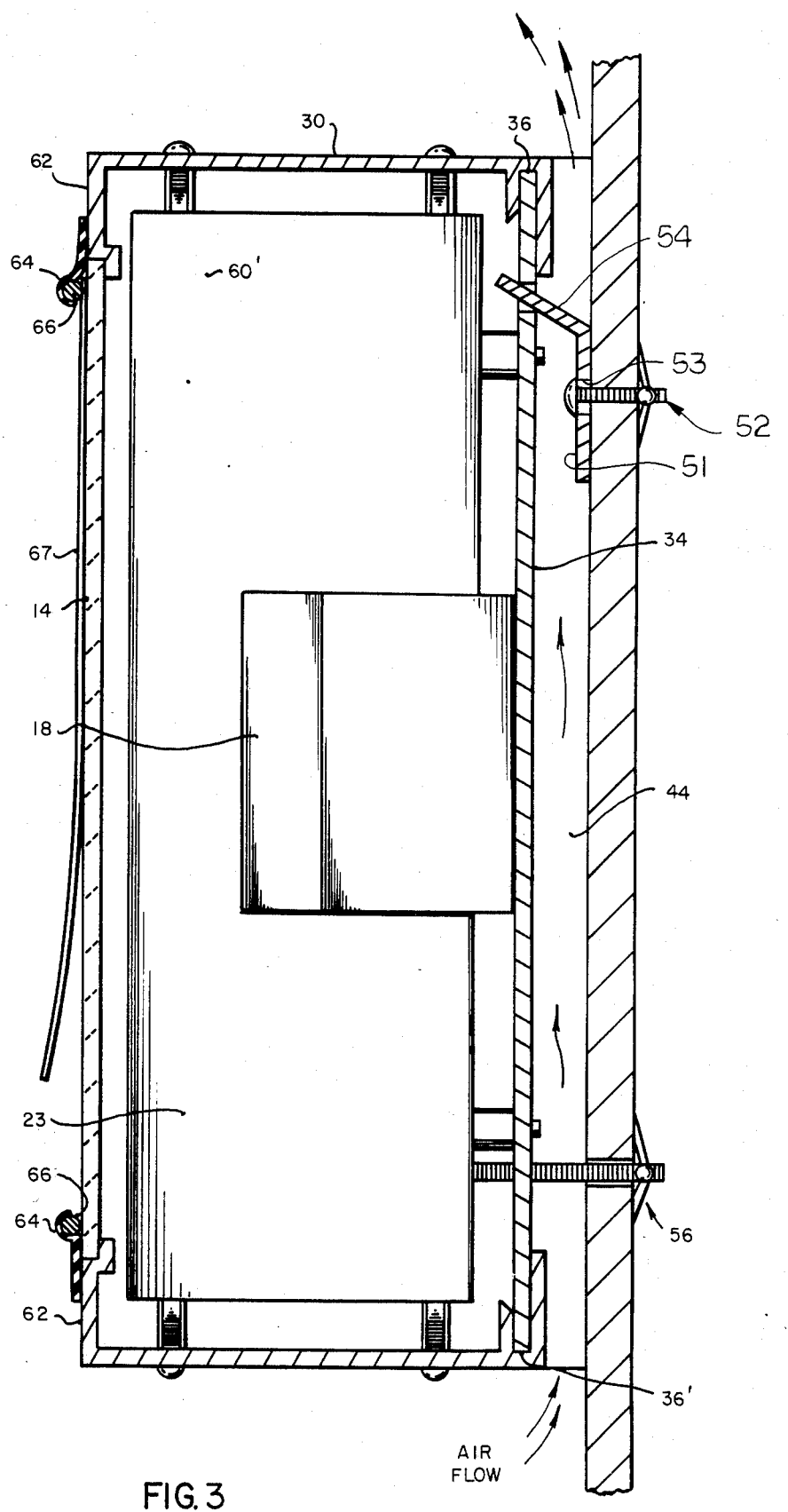
FIG. 3 is an enlarged, diagrammatic, sectional view taken generally along the line 3—3 of FIG. 1.
Figure 4:
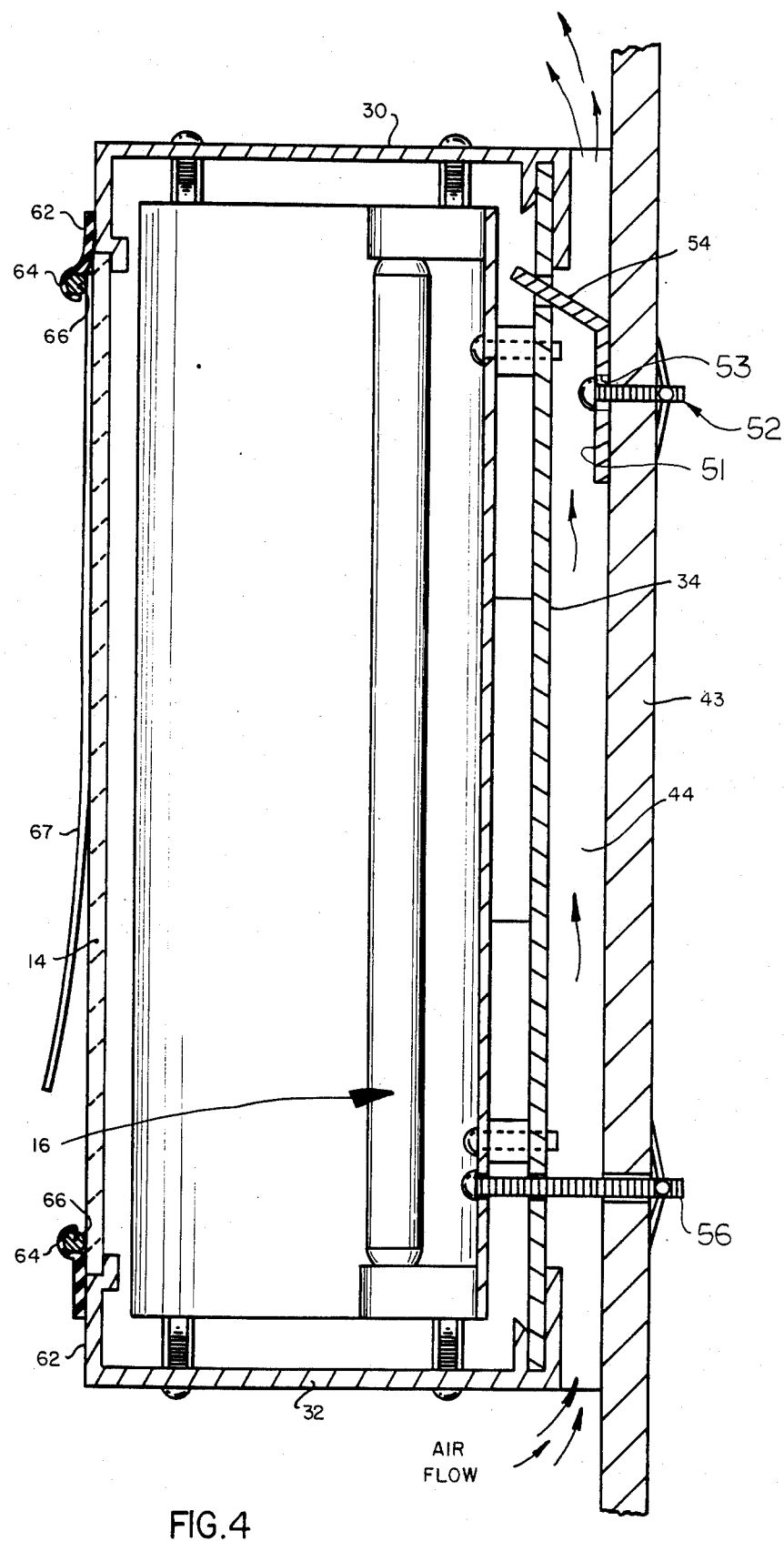
FIG. 4 is an enlarged, diagrammatic, sectional view taken generally along the line 4—4 of FIG. 1.
Figure 5:
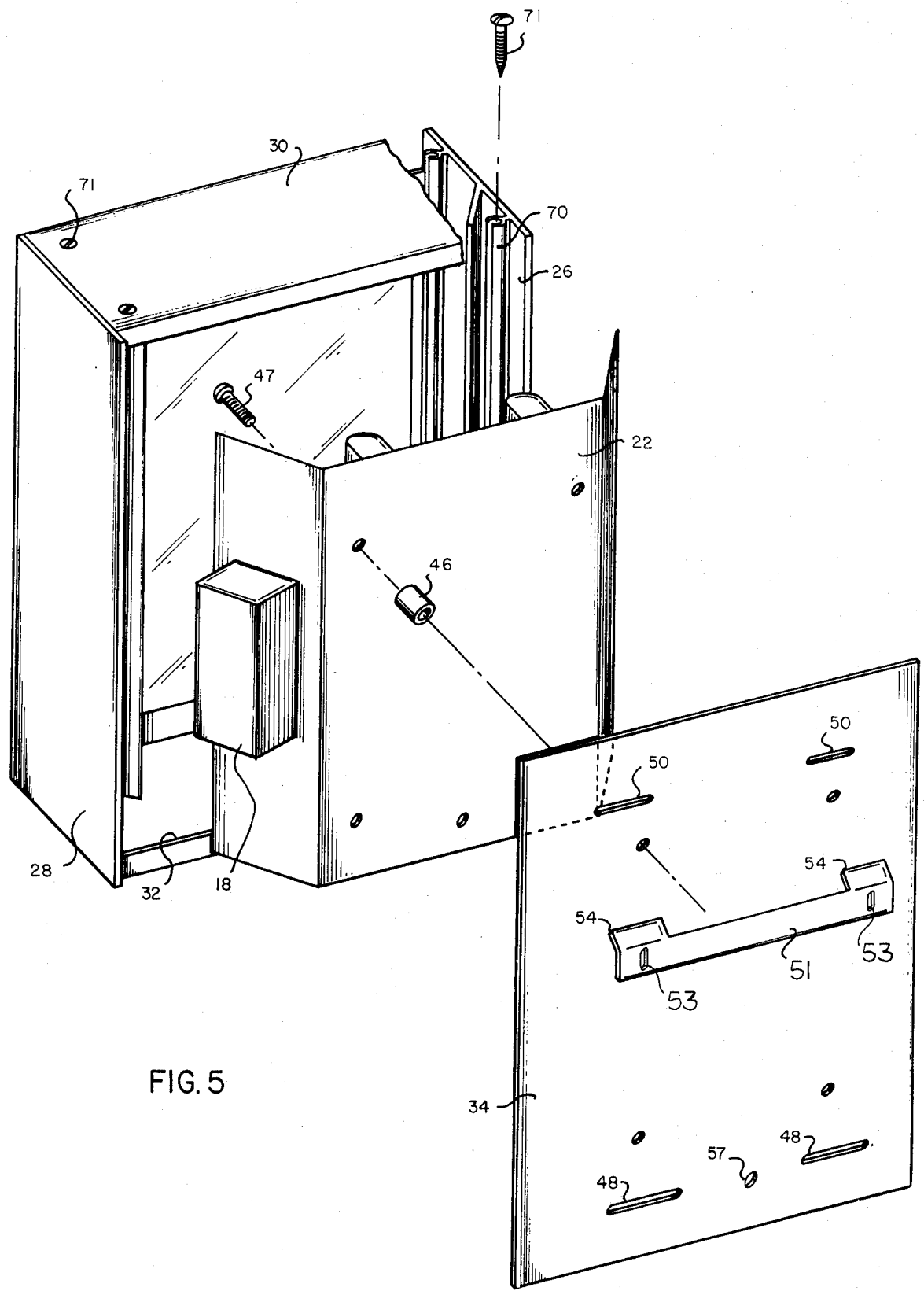
FIG. 5 is an exploded, diagrammatic, rear perspective view of the apparatus of FIG. 1.

Referring now more particularly to FIGS. 1-6 of the drawings, apparatus 10 for illuminating and displaying x-ray film or other transparencies, comprises an enclosure or housing 12 providing an illuminatable viewing area in the form of a translucent screen 14. Disposed within housing 12 is a lamp assembly 16, in this instance including a pair of conventional fluorescent light tubes, directing light through screen 14, and a ballast 18 operably connected to the lamp assembly 16 for controlling the voltage applied thereto in a conventional manner. Associated with ballast 18 is a heat sink for dissipating heat from ballast 18 in a manner to be described in detail below. The hottest region on the ballast is usually one side at which energizing coils are close to the surface.

A shaped light reflector 22 is positioned within housing 12 behind the lamp assembly 16 for directing light from lamp assembly 16 toward the screen 14. Ballast 18 is mounted on one of two angled arms 23 of reflector 22 so as to face away from lamp assembly 16, with the heat sink structure contacting the ballast 18 while being in spaced parallel relation to the reflector 22. More specifically, the heat sink comprises an element or wing 24 integral with one side wall and fabricated of a material having a high heat conductivity, such as aluminum. The heat sink element 24 is positioned so as to be in thermal energy exchange relation with the heated top or back portion of the ballast 18.

The housing 12 also comprises an opposite, substantially parallel side wall 28, a top wall 30 disposed substantially perpendicularly to side walls 26 and 28, a bottom wall 32 arranged substantially parallel to and spaced from top wall 30. It further includes a back wall 34 covering the rear opening defined by the generally rectangular framework formed by the aforementioned walls 26, 28, 30, and 32. Each side wall 26, 28 includes an integral wing along its length that defines the heat sink element 24. The wing or heat sink 24 extends at a predetermined angle from the plane of the side wall, with an angle or about 30° having been found satisfactory. Although only side wall 26 need be provided with a wing element 24 so as to be in contact with associated ballast 18, it is desirable to use the same shape for the opposite side wall 28 so as to permit a ballast 18 to be disposed on either side of housing 12 as desired.

Preferably, all of the walls 26, 28, 30, 32 which form the periphery of the enclosure 12 are of extruded aluminum and the side walls 26 and 28 and the top and bottom walls 30 and 32 are alike. Therefore the extrusions can be formed to long lengths and principal parts of the enclosures can be made of different rectangular shapes in modular sizes for accommodating different numbers of lamps, simply by cutting these elements to size. In addition, heat is conducted from the interior to all of these extruded walls, which then act as heat dissipators, preventing excessive internal heating and hot spots.

Each side wall 26, 28 includes a groove 36 formed by a pair of substantially parallel ridges 38 and 40 extending laterally away from a plane of the associated wall 26, 28 in the direction of the other of the walls 26, 28. The groove 36 retainingly receives a peripheral edge of the back housing wall 34. As can be appreciated, the groove 36 is formed adjacent the rearward edge of the associated side wall 26, 28, with a lip 42 extending further rearwardly of an associated groove 36 and engaging with a building wall 43 on which housing 12 is mountable and forming a heat dissipating air passage or gap 44 between back wall 34 and the surface of the building wall 43. The flow arrows in FIGS. 3 and 4 indicate the manner in which air is drawn upwardly across the back wall 34 of housing 12 in order to dissipate heat from the housing.

Each of the top and bottom walls 30 and 32 is likewise provided with grooves 36' in the same plane as the side wall grooves 36 for receiving a periphery of the back wall 34.

Between the light reflector 22 and the back wall 34 a pair of similar washers 46 are disposed so as to properly space the light reflector 22 from the housing back wall 34 and to rigidify the entire assembly. Each of the washers 46 receives a screw fastener 47 to attach reflector 22 to the housing back wall 34.

Louvers 48 are provided in back wall 34 to improve convection of heated air from within the housing 12.

The housing back wall 34 includes a pair of lateral or horizontal slots, although a single long horizontal slot or other arrangements might alternatively be used. These horizontal slots 50 are provided above the mid-region of the back wall 34, for mounting the illuminator on a building wall, and lie along a given horizontal line. The illuminator apparatus 10 further includes a hanger bar 51 of relatively light weight mountable on the surface of the building wall 43, such as by a pair of conventional toggle bolt or screw fasteners 52 insertable through different ones of a pair of vertical slotted apertures 53 in the hanger 51. The vertical slot apertures 53 enable the horizontal attitude of the hanger bar 51 to be adjusted conveniently prior to mounting of the illuminator. The weight of the illuminator is not sufficient to cause slippage along the slot apertures 53, when the fasteners 52 are tightened in final position. The hanger 51 further comprises along its upper surface a pair of spaced apart ears 54 angled upwardly and at positions corresponding to the slots 50 in the back wall 34. The ears 54 are dimensioned to slide easily within the slots 50, and because of this registration and their upward angle they firmly hold the apparatus 10 in the selected attitude (usually vertical) except against a very strong upward force. An operator merely lifts the illuminator housing 12, and registers the ears 52 on the hanger bar 51 within the slots 50 on the back wall 34. The hanger bar 51 then supports the housing 12 firmly in place on the building wall 43, and in proper level position. Although it is not necessary to the mounting of housing 12 by hanger 51, an added toggle bolt fastener 56 can be located near the lower portion of housing 12 in order to more firmly secure the housing 12. This fastener 56 is accessible from the front of the illuminator by removing the viewing screen 14 from the mechanism by which it is held.

The viewing area in this example comprises the generally planar, translucent, viewing screen 14 arranged substantially parallel to and spaced from the housing back wall 34. An inwardly directed vertical flange 60 is formed on each of the side walls 26, 28, together with mating flanges 61 on each of the top and bottom walls 30 and 32, for seating the viewing screen 14 about its periphery. Each of the top wall 30 and bottom wall 32 include a horizontal rail 62 from which extends a C-shaped holder 64 encompassing a resilient strip 66. The strip 66, which can be a length of conventional weatherstripping, gasket material or the like, resiliently engages screen 14 and retains it in place. It also yields to receive the edge of an x-ray film 67 so as to hold the film in place on the screen 14 as it is illuminated by apparatus 10.

A conventional on-off master switch 68 advantageously is mounted in a central-side portion of housing 12, generally on the side thereof opposite placement of ballast 18, to actuate the lamp assembly 16 of apparatus 10. Although specific electrical circuitry has not been shown in the drawings, it is to be understood that such circuitry is conventional and is commonly employed in x-ray film and other transparency illuminators. Projecting half-sleeve elements 70 (best seen in FIG. 6) form self-threading female members aligned along vertical apexes parallel to the side walls 26, 28. Screws 71 (shown in phantom only in FIG. 6) at the corners of the top wall 30 and bottom wall 32 extend into the central apertures in the half-sleeve elements 70 to unite the peripheral walls of the housing 12.

In the illuminator system of FIG. 6, heat is drawn principally away from the viewing screen 14, and is effectively dissipated in a variety of ways. Direct heat transfer toward the user from the ballast 18 is limited by the interposed relatively thin reflector 22, but more significantly by heat transfer to the thicker wing 24 on the side wall 26, and thence to the side wall 26 itself and thereafter to the adjacent walls 28, 30 and also the back wall 34. These surfaces provide a large heat transfer area for cooling. In addition the virtually open cooling channel behind the back wall 34 aids in heat dissipation by natural convection across its surface. Although this construction is much more versatile than that used in prior illuminators because of the much greater number of variants that can be farbricated, it effectively limits the hot spot tendency, decreases cycling and improves user comfort.

Figure 7:
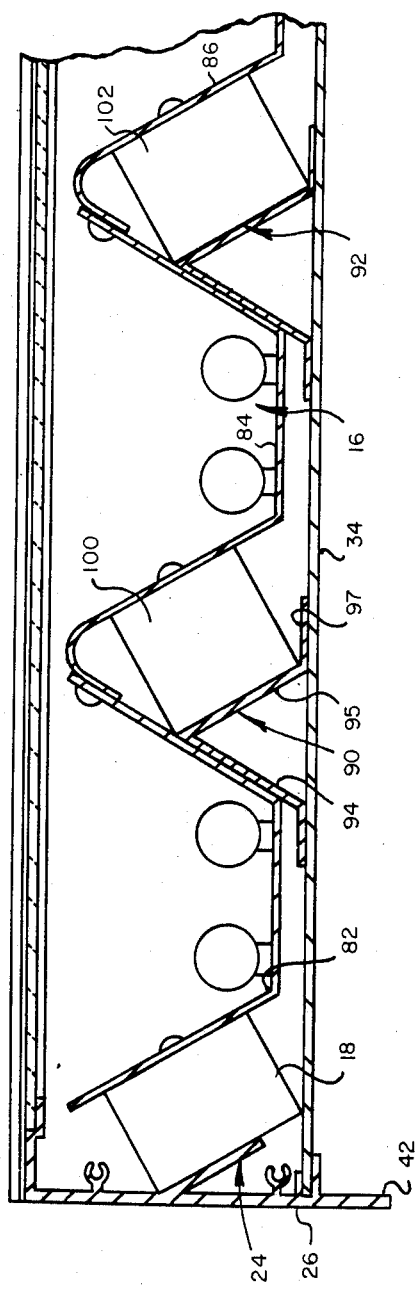
FIG. 7 is a horizontal, sectional view showing a second exemplification of apparatus according to the present invention.
Figure 8:
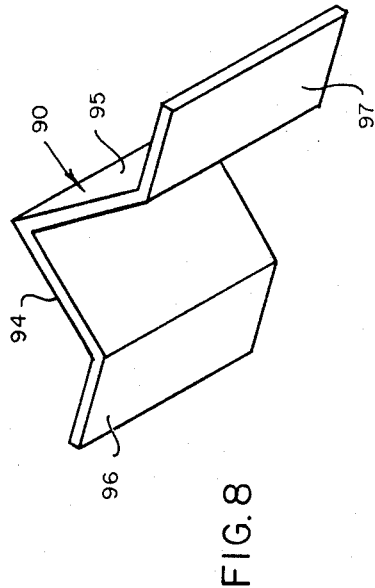
FIG. 8 is a perspective view showing a generally "V" shaped heat dissipating element used with the apparatus of FIG. 7.

Referring now more particularly to FIGS. 7 and 8 of the drawings, portions of a larger illuminator apparatus 80 according to the present invention is illustrated. This illuminator 80 includes a set of three channel-shaped reflectors 82, 84, 86 arranged in side-by-side juxtaposition and each holding a two lamp assembly 16, shown only generally inasmuch as the details may be the same as in the example of FIGS. 1–6 except for extension of the system into a triple length module. The ballast 18 at the side wall 26 is in thermal contact with the integral heat sink wing 24 as in the prior example. Spacer elements 90, 92 generally in the form of a flanged "V" are mounted on the back wall 34. As seen on the middle spacer element 90 a pair of diverging legs 94, 95 extend from an apex and terminate in flat flanges 96, 97 which are in thermal interchange relation with the back wall 34. One of the legs 95 abuts and is in thermal interchange with an associated ballast 100 for conducting heat away from the ballast and to the back wall 34. Similarly a leg of the remaining spacer 92 draws heat from the highest temperature portion of its associated ballast 102 to the back wall 34.

Thus, extending the basic module of FIGS. 1–6 to a larger multiple unit as in FIGS. 7 and 8 introduces no special redesign or heating problems. Heat is efficiently conducted away from the added ballast elements to the back wall 34, which is cooled by convection due to the spaced provided from the building wall. The peripheral walls and reflectors may all be of standard lengths, cut down from longer extrusions as desired. Even the screen 14 and back wall 34 are fabricated to size from larger area stock.

As can be readily understood from the above description and from the drawings, x-ray film illuminating apparatus is capable of efficiently dissipating heat generated by the ballast, and any generated by the lamps, so as to substantially reduce "cycling" caused by overheating. Film can be readily inserted and held at the margins of the screen and neither the film nor the person viewing it is exposed to a substantial heat source. The height of apparatus according to the present invention, as well as the width thereof, can also be increased or decreased to meet particular fabrication requirements.

Although there have been described above and illustrated in the drawings various forms and modifications in accordance with the invention, it will be appreciated that the invention is not limited thereto but encompasses all variations and alternatives falling within the scope of the appended claims.

What is claimed is:

1. Apparatus for illuminating film, comprising, in combination:
    (a) housing means, including means providing an illuminatable viewing area, the housing means including peripheral heat conductive walls;
    (b) lamp means disposed within the housing means for providing illumination to the viewing area;
    (c) internal light reflector means for directing light from the lamp area toward the viewing area of the housing means;
    (d) ballast means disposed within the housing means and mounted on the reflector means, the ballast means being mounted on the reflector means facing away from the lamp means and operatively connected to the lamp means for controlling voltage applied to the lamp means; and
    (e) heat sink means comprising an extended heat conductive element within the housing means in thermal contact with both the ballast means and a peripheral wall of the housing means for dissipating heat from the ballast means via the housing means including the peripheral walls, the heat sink means contacting the ballast means in spaced relation to the reflector means.

2. Apparatus for illuminating film, comprising, in combination:

(a) housing means, including means providing an illuminatable viewing area, the housing means including peripheral heat conductive walls including extruded side walls;
(b) lamp means disposed within the housing means for providing illumination to the viewing area;
(c) ballast means disposed within the housing means and operatively connected to the lamp means for controlling voltage applied to the lamp means; and
(d) at least one of the side walls including an integral wing member comprising heat sink means within the housing means in thermal contact with the ballast means and the housing means for dissipating heat from the ballast means via the housing means including the peripheral walls.

3. The invention as set forth in claim 2 above, wherein the housing means comprises a heat conductive back wall in thermal exchange relation with the side wall and means for maintaining the back wall in spaced apart relation to a building wall on which the apparatus is mounted, for defining a convective cooling channel therebetween.

4. The invention as set forth in claim 3 above, wherein the ballast means includes ballast in the interior region of the back wall and the heat sink means further includes heat conductive spacer means mounted on the back wall and including a pair of diverging legs, one of the legs being arranged in abutting, heat conductive, relation with a hot portion of the associated ballast means and with the back wall for conducting heat away from the ballast means to the back wall.

5. A light box system attachable to a wall for illuminating a film transparency, comprising:
housing means including a front face translucent screen, a pair of side walls of extruded metal, a top wall, a bottom wall, and a back wall, at least one of the side walls including a substantially planar heat conductive element integral therewith and extending longitudinally therealong at an angle from the wall and internally of the housing means;
lamp means disposed within the housing means for providing illumination through the screen;
and ballast means electrically coupled to the lamp means and thermally coupled to the heat conductive element, the hottest region of the ballast means being in thermal energy relation therewith.

6. A light box system attachable to a wall for illuminating a film transparency, comprising:
housing means including a front face translucent screen, a pair of side walls, a top wall, a bottom wall, and a back wall, at least one of the walls including a substantially planar heat conductive element extending at an angle from the wall and internally of the housing means, each of the side walls further including groove means protruding laterally inwardly from the respective one of the side walls and retainingly receiving the back wall of the housing means, and lip means extending rearwardly past the back wall for engagement with a wall surface on which the housing means is mounted and defining a convective air passage between the back wall and a wall surface on which the housing means is mounted;
lamp means disposed within the housing means for providing illumination through the screen;
and ballast means electrically coupled to the lamp means and thermally coupled to the heat conductive element.

7. The invention as set forth in claim 6 above, wherein the housing means further comprises a planar, translucent face plate arranged substantially parallel and spaced from the back wall and forming the viewing area, flange means disposed along each of the side walls for seating the face plate, and resilient means disposed along at least the top wall of the housing means for retainingly holding the face plate in place.

8. The invention as set forth in claim 6 above, wherein the back wall includes means defining at least one lateral slot, and the system further includes a hanger mountable on a wall on which the apparatus is to be disposed and including means for selectively engaging within said lateral slot, and retaining the housing means in place.

9. The invention as set forth in claim 6 above, wherein the substantially planar heat conductive element extends at an angle of about 30°, wherein the lamp means comprise flourescent tube coupled to the individual ballasts, wherein the top and bottom walls are also aluminum extrusions, and wherein the side walls include elongated members disposed along the lengths thereof and the system further includes means engaging the top and bottom walls to the elongated members.

10. The invention as set forth in claim 6 above, wherein the system further includes individual ballast means in an interior region of the back wall and wherein the heat sink means further includes spacer means defined by a pair of diverging legs, one of the legs being arranged in abutting, heat conductive, relation with a rear portion of an associated ballast means for conducting heat away from the ballast means, the spacer means also including terminal flanges in heat conducting relation to the back wall and affixed thereto.

11. The invention as set forth in claim 6 above, wherein the housing means includes reflector means for directing light from the lamp means toward the viewing area of the housing means, the ballast means being mounted on the reflector means and arranged facing away from the lamp means, the heat sink means contacting the ballast means in spaced relation to the reflector means.

12. A side wall extrusion for film illuminating apparatus of the type including a housing providing an illuminatable viewing area, at least one lamp disposed within the housing for providing illumination to the viewing area, and a ballast disposed within the housing and operably connected to the lamp, the side wall extrusion comprising a generally planar elongated aluminum member forming the principal portion of the wall, a substantially planar flange element extending from the planar member at an acute angle, groove means extending laterally from the planar member in the same direction as the flange element for retainingly receiving a mating planar element, lip means extending from the planar member for engagement with a building surface against which the side wall extrusion is to rest and spacing the groove means from such surface, and an elongated element including a half-sleeve cross-section and parallel to the direction of elongation of the aluminum member, the flange element, groove means, lip means and element including a half-sleeve cross-section being integral parts of the extrusion.

13. A film illuminator system attachable to a building wall and comprising:
an illuminator unit including a housing having a back wall, the back wall including means defining at least two horizontally spaced receiving slots;

a wall mountable support member comprising a hanger bar having at least two horizontally spaced apart outwardly angled elements registered within the receiving slots of the back wall, the support member including vertically elongated aperture means for adjustably receiving an attaching device for securing the hanger bar to the building wall; and attaching means positioned within the aperture means for engaging the support member in a desired attitude to the building wall, whereby the illuminator unit is also mounted in a desired attitude.

14. A film illuminator system attachable to a building wall and comprising an illuminator unit including a housing having a back wall, the back wall including means defining at least a pair of spaced apart horizontal slots lying along a horizontal line above the mid-region of the back wall, a wall mountable support member comprising a hanger bar including a pair of spaced apart upwardly angled ears registrable within the horizontal slots of the illuminator unit, the support member including aperture means for adjustably receiving an attaching device for securing the hanger bar to the building wall, the aperture means comprising a pair of horizontally spaced vertical slots in the hanger bar, and attaching means positioned within the aperture means and comprising a pair of threaded devices, each mounted in the building wall through a different one of the vertical slots, and engaging the hanger bar to the building wall in a selected attitude, whereby the illuminator means is also mounted in a selected attitude.

* * * * *